(12) United States Patent
Hayano (10) Patent No.: US 9,367,277 B2
(45) Date of Patent: Jun. 14, 2016

(54) IMAGE PROCESSING APPARATUS

(71) Applicant: Sharp Kabushiki Kaisha, Osaka-shi, Osaka (JP)

(72) Inventor: Yasutomo Hayano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/640,282

(22) Filed: Mar. 6, 2015

(65) Prior Publication Data
US 2015/0261491 A1 Sep. 17, 2015

(30) Foreign Application Priority Data

Mar. 11, 2014 (JP) .................................. 2014-047724

(51) Int. Cl.
*G06F 15/00* (2006.01)
*G06F 3/12* (2006.01)

(52) U.S. Cl.
CPC ............ *G06F 3/1292* (2013.01); *G06F 3/1222* (2013.01); *G06F 3/1236* (2013.01); *G06F 3/1238* (2013.01)

(58) Field of Classification Search
CPC .... G06F 3/1236; G06F 3/1222; G06F 3/1238
USPC ....................................................... 358/1.15
See application file for complete search history.

(56) References Cited

U.S. PATENT DOCUMENTS

| | | | |
|---|---|---|---|
| 2003/0107750 A1* | 6/2003 | Takamine | ............... G06K 15/00 358/1.1 |
| 2007/0220255 A1 | 9/2007 | Igarashi | |
| 2014/0201069 A1 | 7/2014 | Arentz | |

FOREIGN PATENT DOCUMENTS

| | | |
|---|---|---|
| JP | 2002-351627 A | 12/2002 |
| JP | 2007-249425 A | 9/2007 |
| JP | 2013-98666 A | 5/2013 |

* cited by examiner

*Primary Examiner* — Saeid Ebrahimi Dehkordy
(74) *Attorney, Agent, or Firm* — Keating & Bennett, LLP (57) ABSTRACT

An image processing apparatus is wirelessly connected to an external communication apparatus that includes a communicator that performs wireless communication with the image processing apparatus, a display that displays information on a screen, a sound generator that generates a sound, and a sound transmitter that sends the generated sound. The image processing apparatus includes a wireless communicator that performs wireless communication with the external communication apparatus, a display that displays information on a screen, a sound receiver that receives the sound sent from the sound transmitter, and a screen switch that switches a screen of the display based on the sound received by the sound receiver. When the sound transmitter sends the sound based on screen information displayed on the display of the external communication apparatus and the sound receiver receives the sound, the screen switch switches the screen of the display of the image processing apparatus according to the screen information.

6 Claims, 9 Drawing Sheets

IMAGE PROCESSING APPARATUS

BACKGROUND OF THE INVENTION

1. Field of the Invention

The present invention relates to an image processing apparatus, and more specifically to an image processing apparatus in which, when the image processing apparatus is wirelessly connected to an external communication apparatus, authentication of the connection is performed by a simple operation.

2. Description of the Related Art

Conventionally, a method of easily authenticating, using a sound, a wireless connection between an MFP (Multi Function Printer), an image data storage apparatus, or the like, which serves as an image processing apparatus and a portable terminal with a camera function, a digital camera, or the like, which serves as an external communication apparatus is described in JP 2007-249425 A, for example.

The connection authentication method described in JP 2007-249425 A relates to, for example, wireless connection authentication between a printer and a digital camera. Here, the digital camera includes a generating unit that generates a sound of a specific pattern, by which the digital camera can be identified; an output unit that outputs the sound; and a communicator that performs wireless communication with the printer. The printer includes an input unit to which the sound outputted from the output unit of the digital camera is inputted; an authenticator that performs authentication of a connection to the digital camera based on the specific pattern; and a communicator that performs wireless communication with the digital camera. When the authenticator of the printer authenticates a wireless connection to the digital camera based on the specific pattern, wireless communication starts between the printer and the digital camera.

According to the connection authentication method described in JP 2007-249425 A, a wireless connection between an image processing apparatus such as a printer and an external communication apparatus such as a digital camera supposedly can be performed by a simple operation.

However, in such a connection authentication method, although various modes of connection authentication are proposed, an operation method performed by a user when performing connection authentication is not described. Hence, there is a problem that the user does not know how he/she should operate the image processing apparatus and the external communication apparatus.

SUMMARY OF THE INVENTION

Preferred embodiments of the present invention provide an image processing apparatus in which, when the image processing apparatus is wirelessly connected to an external communication apparatus, a user can simply and easily perform an operation related to the connection.

According to a preferred embodiment of the present invention, an image processing apparatus is configured to be wirelessly connected to an external communication apparatus and includes a communicator configured to perform wireless communication with the external communication apparatus; a display configured to display various types of information on a screen; a sound receiver configured to receive a sound sent from the external communication apparatus; and a screen switch configured to switch the screen of the display based on the sound received by the sound receiver; wherein when the sound receiver receives the sound sent from the external communication apparatus, the screen switch is configured to switch the screen of the display according to screen information displayed on the external communication apparatus.

The image processing apparatus (an MFP, a copier, a personal computer, etc.) of various preferred embodiments of the present invention preferably is wirelessly connected to an external communication apparatus (a portable terminal (a smartphone, a mobile phone, or a tablet), a personal computer, etc.).

The external communication apparatus includes a communicator that performs wireless communication with the image processing apparatus; a display that displays various types of information on a screen; a sound generator that generates a sound of a pattern; and a sound transmitter that sends the sound generated by the sound generator. Here, the communicator, the display, the sound generator, and the sound transmitter of the external communication apparatus can incorporate their corresponding components which are normally provided to an external communication apparatus which is widely supplied in the market. The image processing apparatus includes a communicator that performs wireless communication with the external communication apparatus; a display that displays various types of information on a screen; a sound receiver that receives the sound sent from the sound transmitter; and a screen switch that switches a screen of the display on the image processing apparatus side based on the sound received by the sound receiver. Here, the communicator, the display, and the sound receiver of the image processing apparatus can incorporate their corresponding components which are normally provided to an image processing apparatus which is widely supplied in the market. In addition, the screen switch of the image processing apparatus can be provided by, for example, partially modifying a controller of the image processing apparatus.

In a preferred embodiment of the present invention, when the sound transmitter sends a specific sound based on screen information displayed on the display on the external communication apparatus side and the sound receiver receives the sound, the screen switch automatically switches the screen of the display on the image processing apparatus side according to the screen information.

As described above, screen information displayed on the display of the external communication apparatus is transmitted to the sound receiver of the image processing apparatus via a specific sound sent from the sound transmitter, and a screen of the display on the image processing apparatus side is automatically switched according to the screen information. Therefore, according to the image processing apparatus of a preferred embodiment of the present invention, a screen of the display of the image processing apparatus preferably is automatically switched according to screen information of the external communication apparatus in a situation where the external communication apparatus and the image processing apparatus are not connected to each other, as well as in a situation where the external communication apparatus and the image processing apparatus are connected to each other by a network. In addition, since the screen of the display of the image processing apparatus is automatically switched, the number of times a user manually switches the screen of the display of the image processing apparatus in order to establish a wireless connection with the external communication apparatus is significantly reduced compared to conventional devices.

The sound sent by the external communication apparatus preferably has a sound pattern set according to information to be displayed on the external communication apparatus.

When the sound pattern is set in this manner, a sound associated with specific information displayed on a screen of the external communication apparatus is generated and transmitted to the sound receiver of the image processing apparatus by the sound generator and the sound transmitter. Therefore, by receiving, by the sound receiver of the image processing apparatus, the content of the information displayed on the screen of the external communication apparatus side display and switching, by the screen switch, the screen of the image processing apparatus, the image processing apparatus identifies the content of the information displayed on the screen of the external communication apparatus.

The sound pattern preferably is set based on at least one of loudness, pitch, length, and tone of sound.

As a result, a great variety of patterns can be generated by any combination of loudness, pitch, length, and tone of sound. Thus, even if the content of information to be displayed on the screen of the external communication apparatus is of a great variety, such a great variety of contents are handled.

The sound sent from the sound transmitter of the external communication apparatus preferably uses a frequency band inaudible to humans and receivable by the sound receiver.

When such a frequency band is used for a sound to be sent from the sound transmitter, the sound sent from the sound transmitter is received by the sound receiver of the image processing apparatus, but is inaudible to a user. Thus, generation of unwanted noise is avoided when a wireless connection is established between the image processing apparatus and the external communication apparatus.

The sound preferably has a frequency band of 20 to 25 kilohertz.

The lower limit of sound audible to the human ear is commonly stated to be on the order of 16 to 20 hertz and the upper limit be on the order of 16 to 20 kilohertz. Thus, by configuring the sound receiver of the image processing apparatus to be able to receive sounds in a frequency band of 20 to 25 kilohertz, generation of unwanted noise is avoided.

The image processing apparatus according to a preferred embodiment of the present invention preferably includes an authenticator configured to perform connection authentication with the external communication apparatus, wherein the authenticator is configured to perform connection authentication with the external communication apparatus based on the sound received by the sound receiver, and then, the screen switch switches the screen of the display to a screen necessary for operations to be performed after the connection authentication.

When the image processing apparatus is configured in this manner, the authenticator performs connection authentication with the external communication apparatus based on a sound received by the sound receiver, and after the connection authentication, the screen switch automatically switches the screen of the image processing apparatus and display a screen necessary for operations to be performed thereafter.

Here, an example of the operations includes an input of a password to transfer a file stored on the external communication apparatus to the image processing apparatus, authentication of the password subsequent to the input, and transmission of the file subsequent to the authentication.

When the operations performed after connection authentication are those described in the example, after connection authentication is performed by the authenticator, an input of a file transfer password by the user on a screen necessary for the operations and authentication of the password by the authenticator are performed and then a file stored on the external communication apparatus is transferred to the image processing apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in more detail below using the drawings. Note that the following description is merely illustrative in all respects and should not be construed as limiting the present invention.

First Preferred Embodiment

Figure 1:
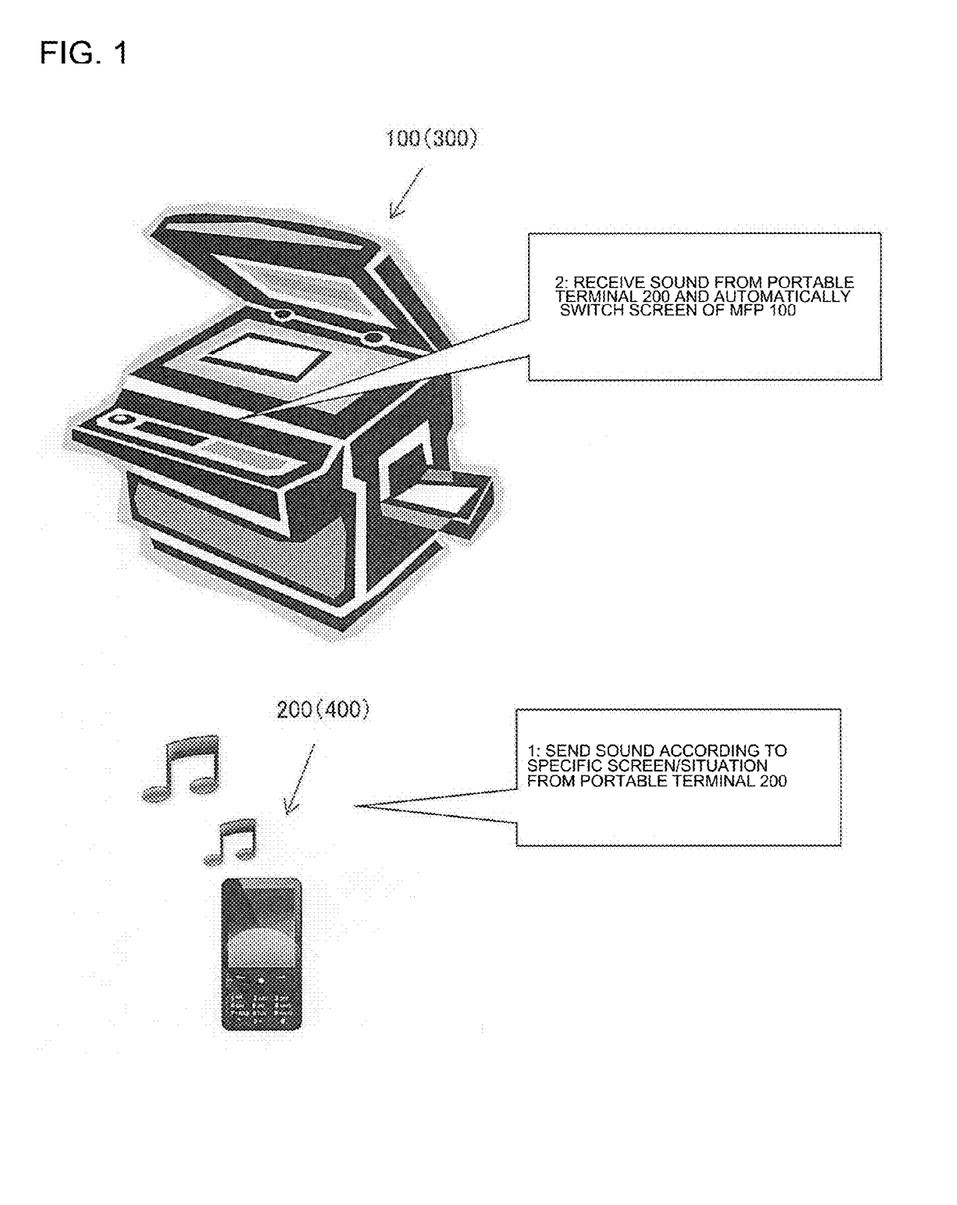
FIG. 1 is an image diagram showing a wireless connection between an image processing apparatus according to first, second and third preferred embodiments of the present invention and an external communication apparatus.
Figure 2:
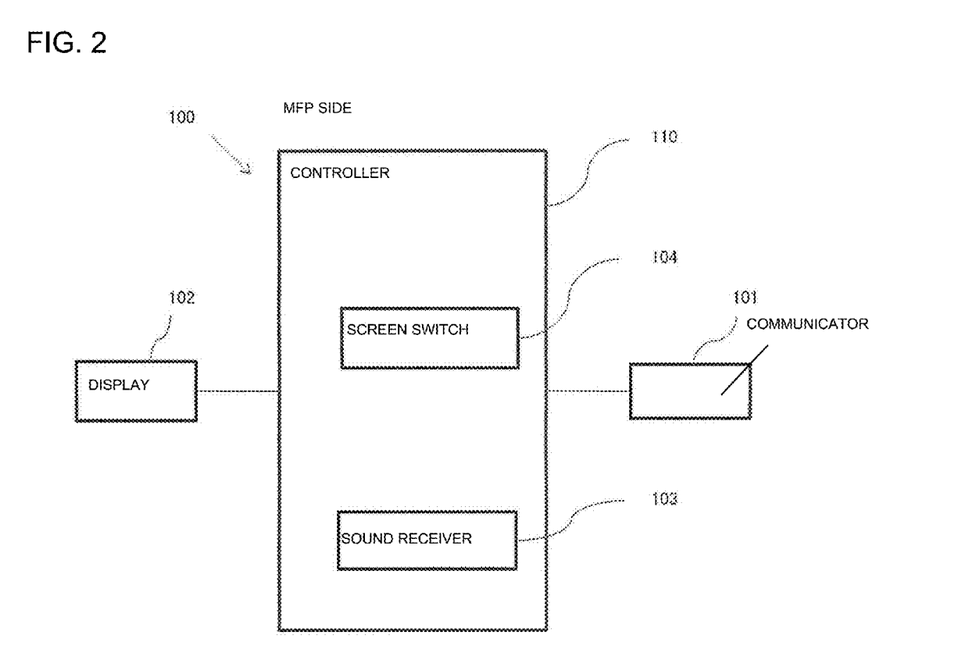
FIG. 2 is a block diagram showing a schematic configuration of an image processing apparatus according to the first preferred embodiment of the present invention.
Figure 3:
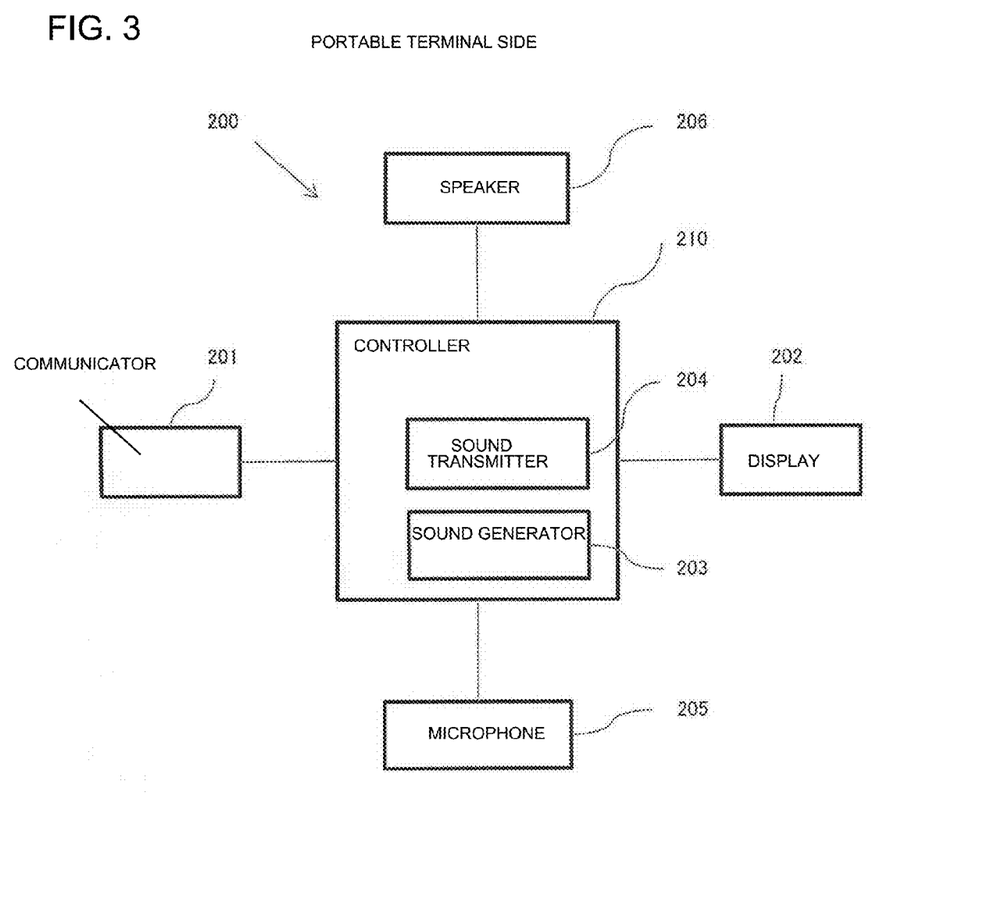
FIG. 3 is a block diagram showing a schematic configuration of an external communication apparatus which is wirelessly connected to the image processing apparatus according to the first preferred embodiment of the present invention.

FIG. 1 is an image diagram showing a wireless connection between an image processing apparatus according to first, second and third preferred embodiments of the present invention and an external communication apparatus. FIGS. 2 and 3 are a block diagram showing a schematic configuration of an image processing apparatus according to the first preferred embodiment of the present invention and a block diagram showing a schematic configuration of an external communication apparatus which is wirelessly connected to the image processing apparatus, respectively.

In FIGS. 1 to 3, 100 indicates an MFP (Multi Function Printer) defining and serving as an image processing apparatus according to the first preferred embodiment, and 200 indicates a smartphone which is an example of a portable terminal defining and serving as an external communication apparatus that is configured to be wirelessly connected to the MFP 100.

The MFP 100 includes a communicator 101, a display 102, a sound receiver 103, and a screen switch 104. The smartphone 200 includes a communicator 201, a display 202, a sound generator 203, and a sound transmitter 204.

The communicator 201 of the smartphone 200 is configured to perform wireless communication with the communicator 101 of the MFP 100. The display 202 is configured to display various types of information on a screen. The sound generator 203 is configured to generate sounds of patterns. The sound transmitter 204 is configured to send a sound generated by the sound generator 203.

The sound generator 203 is electrically connected to a microphone 205 to input external sounds. The sound transmitter 204 is electrically connected to a speaker 206 to externally output a sound sent therefrom. The sound generator 203 and the sound transmitter 204 are included in a controller 210. The controller 210 is electrically connected to the communicator 201, the display 202, the microphone 205, and the speaker 206 and is configured or programmed to control all of the functions of the smartphone 200.

The communicator 201, the display 202, the sound generator 203, the sound transmitter 204, the microphone 205, the speaker 206, and the controller 210 of the smartphone 200 incorporate their corresponding components which are normally provided to a smartphone which is widely supplied in the market.

The communicator 101 of the MFP 100 is configured to perform wireless communication with the communicator 201 of the smartphone 200. The display 102 is configured to display various types of information on a screen. The sound receiver 103 is configured to receive a sound which is sent from the sound transmitter 204 of the smartphone 200 and outputted from the speaker 206. The screen switch 104 is configured to switch a screen of the display 102 based on the sound received by the sound receiver 103.

The sound receiver 103 and the screen switch 104 are included in a controller 110. The controller 110 is electrically connected to the communicator 101 and the display 102 and is configured or programmed to control all of the functions of the MFP 100.

The patterns of sounds generated by the sound generator 203 of the smartphone 200 preferably are set in advance according to specific information to be displayed on the screen of the display 202. Each pattern is generated by variously combining two types of sounds, long and short sounds. A plurality of patterns according to a plurality of pieces of specific information to be displayed on the screen of the display 202 are preferably used.

In addition, the sound which is sent from the sound transmitter 204 and externally outputted from the speaker 206 is a specific sound based on the above-described plurality of patterns, and is audible to the human ear.

In the MFP 100, when the sound transmitter 204 sends a specific sound based on screen information displayed on the display 202 of the smartphone 200 and the sound receiver 103 receives the sound through the speaker 206, the screen switch 104 switches the screen of the display 102 according to the screen information.

Therefore, according to the MFP 100 of the first preferred embodiment, the screen of the display 102 of the MFP 100 is automatically switched according to the screen information of the smartphone 200 in a situation where the smartphone 200 and the MFP 100 are not connected to each other, as well as in a situation where the smartphone 200 and the MFP 100 are connected to each other by a wireless network.

In addition, since the screen of the display 102 of the MFP 100 is automatically switched in this manner, the number of times a user manually switches the screen of the display 102 of the MFP 100 in order to establish a wireless connection with the smartphone 200 is reduced compared to conventional cases.

Second Preferred Embodiment

Figure 4:
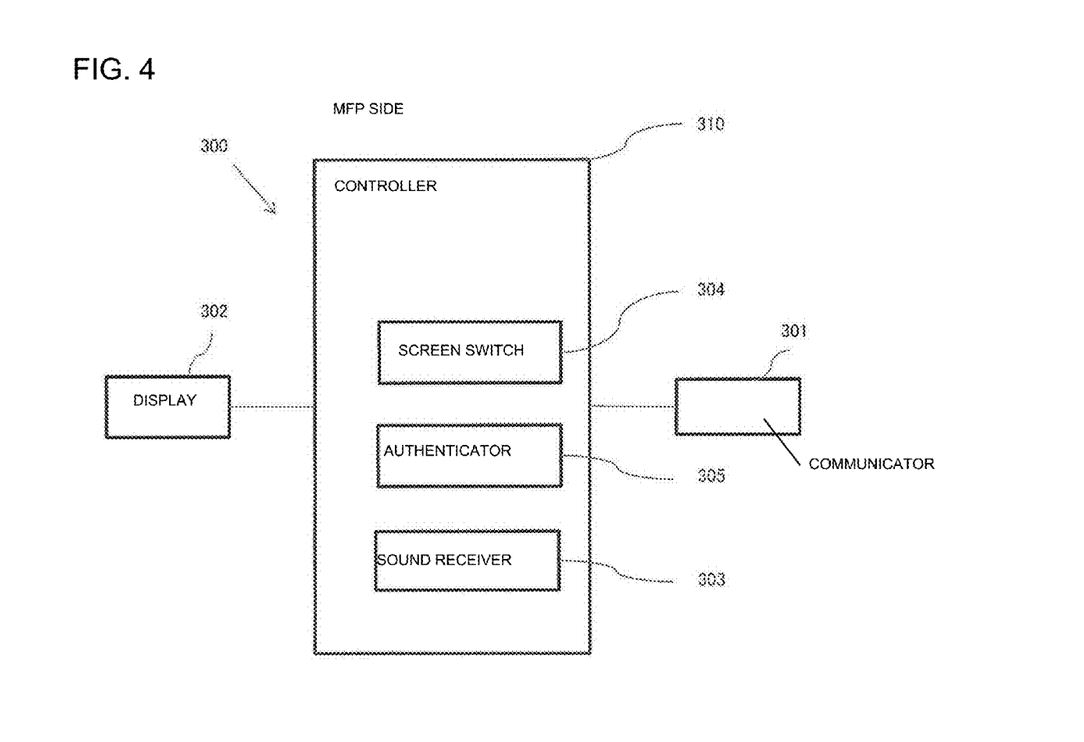
FIG. 4 is a block diagram showing a schematic configuration of an image processing apparatus according to the second and third preferred embodiments of the present invention.
Figure 5:
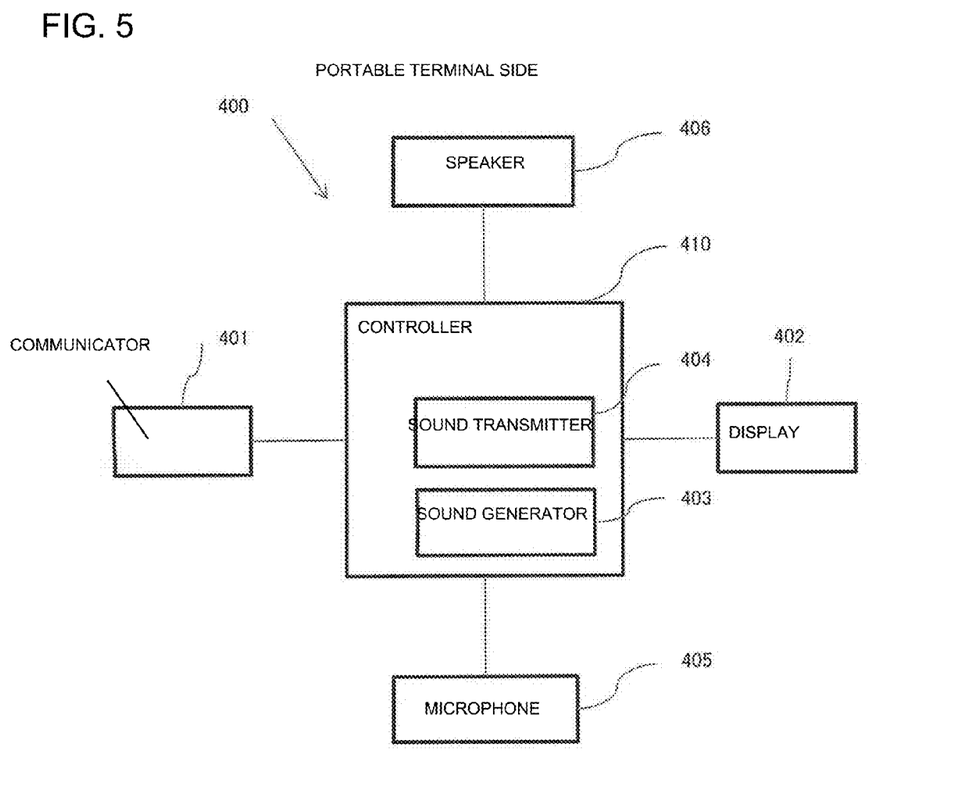
FIG. 5 is a block diagram showing a schematic configuration of an external communication apparatus which is wirelessly connected to the image processing apparatus according to the second and third preferred embodiments of the preferred invention.

FIG. 1 is an image diagram showing a wireless connection between an image processing apparatus according to the first, second and third preferred embodiments of the present invention and an external communication apparatus. FIGS. 4 and 5 are a block diagram showing a schematic configuration of an image processing apparatus of the second preferred embodiment of the invention and a block diagram showing a schematic configuration of an external communication apparatus which is wirelessly connected to the image processing apparatus, respectively.

In FIGS. 1, 4, and 5, 300 indicates an MFP (Multi Function Printer) defining and serving as an image processing apparatus according to the second preferred embodiment, and 400 indicates a smartphone which is an example of a portable terminal defining and serving as an external communication apparatus that is configured to be wirelessly connected to the MFP 300.

The MFP 300 includes a communicator 301, a display 302, a sound receiver 303, a screen switch 304, and an authenticator 305. The smartphone 400 includes a communicator 401, a display 402, a sound generator 403, and a sound transmitter 404.

The communicator 401 of the smartphone 400 is configured to perform wireless communication with the communicator 301 of the MFP 300. The display 402 is configured to display various types of information on a screen. The sound generator 403 is configured to generate sounds of patterns. The sound transmitter 404 is configured to send a sound generated by the sound generator 403.

The sound generator 403 is electrically connected to a microphone 405 to input external sounds. The sound transmitter 404 is electrically connected to a speaker 406 to externally output a sound sent therefrom. The sound generator 403 and the sound transmitter 404 are included in a controller 410. The controller 410 is electrically connected to the communicator 401, the display 402, the microphone 405, and the speaker 406 and is configured or programmed to control all of the functions of the smartphone 400.

The communicator 401, the display 402, the sound generator 403, the sound transmitter 404, the microphone 405, the speaker 406, and the controller 410 of the smartphone 400 incorporate their corresponding components which are normally provided to a smartphone which is widely supplied in the market.

The communicator 301 of the MFP 300 is configured to perform wireless communication with the communicator 401 of the smartphone 400. The display 302 is configured to display various types of information on a screen. The sound receiver 303 is configured to receive a sound which is sent from the sound transmitter 404 of the smartphone 400 and outputted from the speaker 406. The screen switch 304 is configured to switch a screen of the display 302 based on the sound received by the sound receiver 303. The authenticator 305 is configured to perform connection authentication with the smartphone 400.

The sound receiver 303, the screen switch 304, and the authenticator 305 are included in a controller 310. The controller 310 is electrically connected to the communicator 301 and the display 302 and configured or programmed to control all of the functions of the MFP 300.

The patterns of sounds generated by the sound generator 403 of the smartphone 400 are set in advance according to specific information to be displayed on the screen of the display 402. Here, each pattern is preferably generated by variously combining two types of sounds, high and low sounds. A plurality of patterns according to a plurality of pieces of specific information to be displayed on the screen of the display 402 are used.

In addition, the sound which is sent from the sound transmitter 404 and externally outputted from the speaker 406 is a specific sound based on the above-described plurality of patterns, and uses a frequency band inaudible to humans and receivable by the sound receiver 303 of the MFP 300. Such a frequency band is from 20 to 25 kilohertz.

In the MFP 300, the authenticator 305 performs connection authentication with the smartphone 400 based on a sound received by the sound receiver 303, and after the connection authentication, the screen switch 304 switches the screen of the display 302 and display a screen necessary for operations to be performed thereafter.

Figure 6:
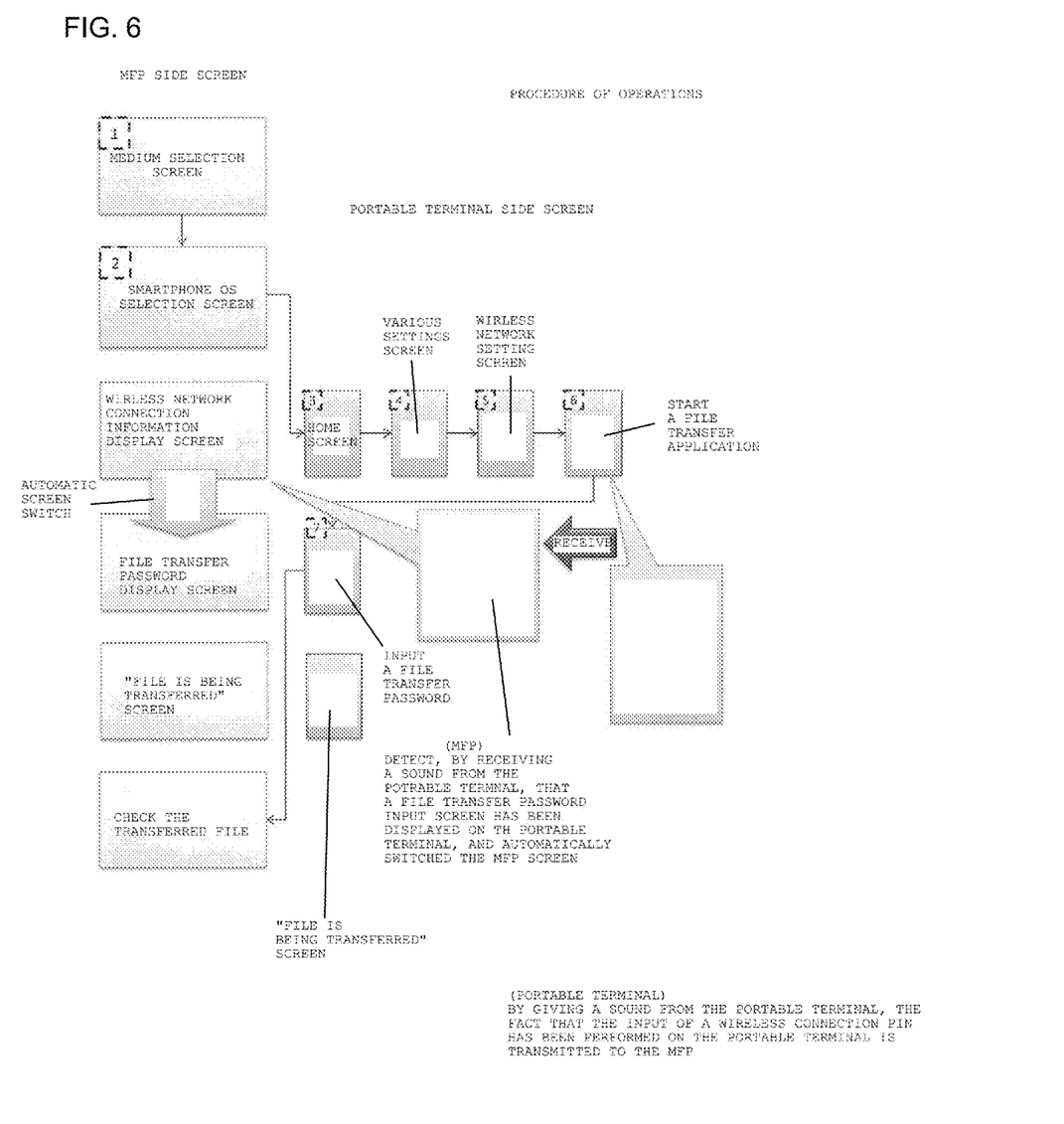
FIG. 6 is an illustrative diagram describing the progress of operations for a wireless connection between the image processing apparatus according to the second and third preferred embodiments of the present invention and the external communication apparatus.
Figure 7:
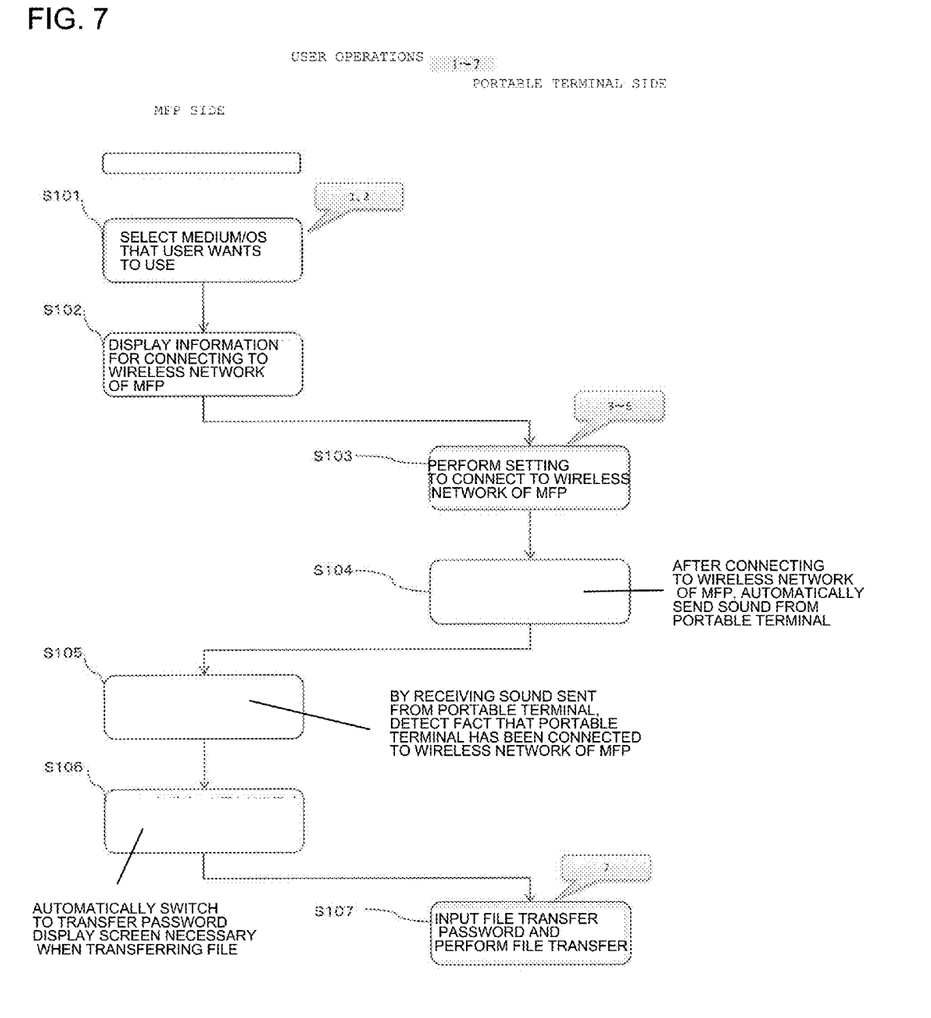
FIG. 7 is a flowchart showing the procedure of the operations shown in FIG. 6.

FIG. 6 is an illustrative diagram describing the progress of operations for a wireless connection between the MFP 300 according to the second preferred embodiment and the smartphone 400. FIG. 7 is a flowchart showing the procedure of the operations shown in FIG. 6.

Next, a method of transferring a specific file stored on the smartphone 400 (e.g., a photo taken with the smartphone 400) to the MFP 300 by wirelessly connecting the MFP 300 according to the second preferred embodiment to the smartphone 400 will be described with reference to FIGS. 6 and 7.

As shown in FIG. 6, a user first operates an operation interface (not shown) of the MFP 300 to switch a screen of the display 302 (a screen on the MFP side) to a "medium selection screen" (operation 1). Then, in order to select an OS of the smartphone 400 defining and serving as a portable terminal which is a medium owned by the user, the user switches the screen on the MFP side to a "smartphone OS selection screen" (operation 2). Operation 1 and operation 2 correspond to the step "select a medium/OS that the user wants to use" which is step S101 shown in FIG. 7.

By operation 1 and operation 2 performed by the user, the screen on the MFP side is changed to a "wireless network connection information display screen" shown in FIG. 6. This screen corresponds to the step "display information for connecting to a wireless network of the MFP" which is step S102 shown in FIG. 7.

When the "wireless network connection information display screen" shown in FIG. 6 is displayed, the user switches a screen of the display 402 of the smartphone 400 (a screen on the portable terminal side) to a "home screen" (operation 3). Then, the user switches from the "home screen" to a "various settings screen" and further to a "wireless network setting screen" and performs various settings for a wireless connection and settings for the wireless network, and then, "starts a file transfer application" (operation 4 to 6). Operation 3 to 6 corresponds to the step "perform setting to connect to the wireless network of the MFP" which is step S103 shown in FIG. 7.

When operations 3 to 6 are performed by the user, a wireless connection PIN input screen to establish a wireless connection with the MFP 300 is displayed on the display 402 of the smartphone 400. Hence, the user inputs a wireless connection PIN on the smartphone 400 to connect to the wireless network of the MFP 300.

When a connection of the smartphone 400 to the wireless network of the MFP 300 is established, a sound based on a specific sound pattern indicating that a connection to the wireless network of the MFP 300 has been established, which is generated in advance by the sound generator 403 of the smartphone 400, is automatically sent from the sound transmitter 404 (step S104 shown in FIG. 7).

The sound is externally outputted from the speaker 406 and is received by the sound receiver 303 of the MFP 300. As described above, the sound is inaudible to humans and receivable by the sound receiver 303 of the MFP 300.

Then, as shown in step S105 of FIG. 7, when the sound receiver 303 of the MFP 300 receives the sound outputted from the smartphone 400, the authenticator 305 of the MFP 300 performs wireless connection authentication with the smartphone 400. Namely, the authenticator 305 detects that the smartphone 400 has been wirelessly connected to the wireless network of the MFP 300.

Then, as shown in step S106, the screen of the display 302 of the MFP 300 is automatically switched by the screen switch 304 to a screen to input a transfer password to transfer the above-described specific file on the smartphone 400 to the MFP 300. This step S106 corresponds to "automatic screen switching" from the "wireless network connection information display screen" to a "file transfer password display screen" shown in FIG. 6.

When the screen of the display 302 of the MFP 300 is automatically switched to a "file transfer password display screen", the user inputs a file transfer password on the display 402 of the smartphone 400, as shown in FIG. 6 (operation 7). When the password inputted is authenticated, the user can transfer the specific file on the smartphone 400 to the MFP 300. The operations of inputting the transfer password and transferring the specific file thereafter correspond to step S107 shown in FIG. 7.

When the transfer is performed, as shown in FIG. 6, the "file is being transferred" screen is displayed on both of the display 302 of the MFP 300 and the display 402 of the smartphone 400.

By the user performing the above-described operations 1 to 7, the specific file stored on the smartphone 400 is transferred to the MFP 300 wirelessly connected to the smartphone 400. Thus, as shown in FIG. 6, the user can check the transferred file on the display 302 of the MFP 300.

Comparative Example

To further clarify the superiority of the second preferred embodiment of the present invention, a comparative example which is a specific implementation example conventionally implemented by the applicant of the present application using the MFP 300 of the second preferred embodiment of the present invention and the smartphone 400 will be described below.

Figure 8:
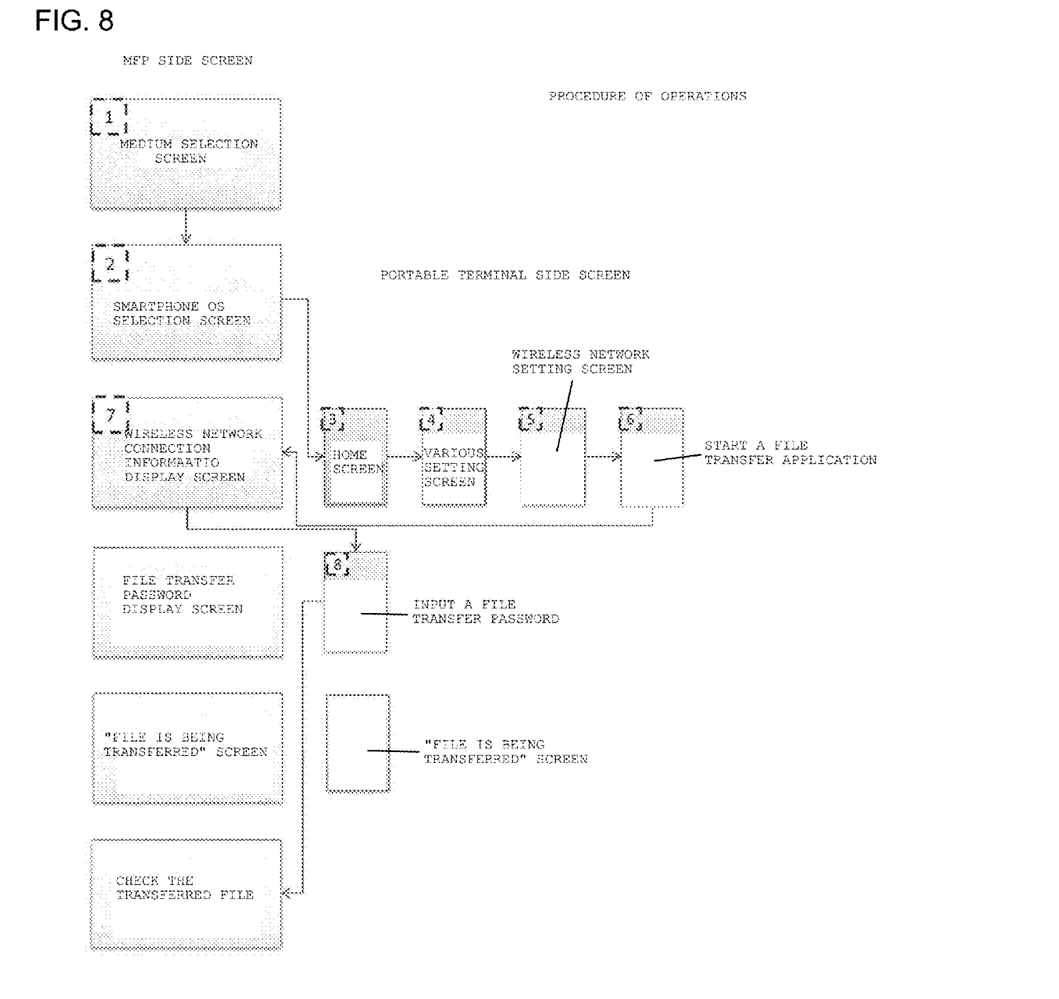
FIG. 8 is an illustrative diagram describing the progress of operations for a wireless connection between an image processing apparatus of a comparative example and an external communication apparatus.
Figure 9:
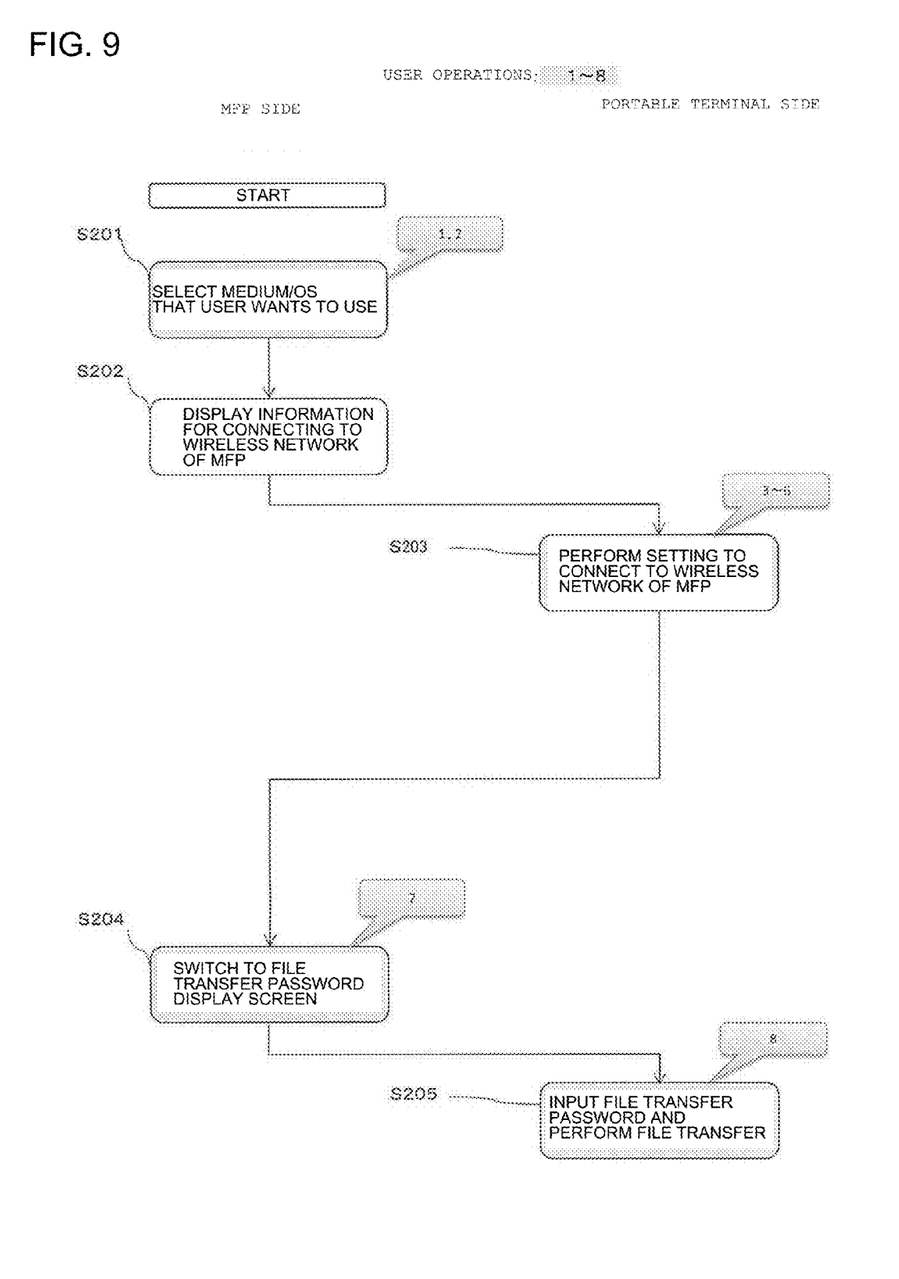
FIG. 9 is a flowchart describing the procedure of the operations shown in FIG. 8.

FIG. 8 is an illustrative diagram describing the progress of operations for a wireless connection between an image processing apparatus of a comparative example and an external communication apparatus. FIG. 9 is a flowchart describing the procedure of the operations shown in FIG. 8.

Next, a method of transferring a specific file stored on the smartphone 400 (a photo taken with the smartphone 400) to the MFP 300 by wirelessly connecting the MFP 300 of the comparative example to the smartphone 400 will be described with reference to FIGS. 8 and 9.

As shown in FIG. 8, the user first operates the operation interface (not shown) of the MFP 300 to switch a screen of the display 302 (a screen on the MFP side) to a "medium selection screen" (operation 1). Then, in order to select an OS of the smartphone 400 defining and serving as a portable terminal which is a medium owned by the user, the user switches the screen on the MFP side to a "smartphone OS selection screen" (operation 2). Operation 1 and operation 2 correspond to the step "select a medium/OS that the user wants to use" which is step S201 shown in FIG. 9.

By operation 1 and operation 2 performed by the user, the screen on the MFP side is changed to a "wireless network connection information display screen" shown in FIG. 8. This screen corresponds to the step "display information for connecting to a wireless network of the MFP" which is step S202 shown in FIG. 9.

When the "wireless network connection information display screen" shown in FIG. 8 is displayed, the user switches a screen of the display 402 of the smartphone 400 (a screen on the portable terminal side) to a "home screen" (operation 3). Then, the user switches from the "home screen" to a "various settings screen" and further to a "wireless network setting screen" and performs various settings for a wireless connection and setting for the wireless network, and then, "starts a file transfer application" (operation 4 to 6). Operations 3 to 6 correspond to the step "perform setting to connect to the wireless network of the MFP" which is step S203 shown in FIG. 9.

When operations 3 to 6 are performed by the user, a wireless connection PIN input screen to establish a wireless connection with the MFP 300 is displayed on the display 402 of the smartphone 400. Hence, the user inputs a wireless connection PIN on the smartphone 400 to connect to the wireless network of the MFP 300.

Thereafter, in order to notify the MFP 300 of the fact that a wireless connection between the smartphone 400 and the MFP 300 has been established, the user operates the "wireless network connection information display screen" of the MFP 300 to manually switch the screen to the next "file transfer password display screen" (operation 7). This operation 7 corresponds to step S204 shown in FIG. 9.

Then, the user inputs a file transfer password on the display 402 of the smartphone 400. When the password inputted is authenticated, the user transfers the specific file on the smartphone 400 to the MFP 300 (operation 8). This operation 8 corresponds to step S205 shown in FIG. 9.

When the transfer is performed, as shown in FIG. 8, the "file is being transferred" screen is displayed on both of the display 302 of the MFP 300 and the display 402 of the smartphone 400.

By the user performing the above-described operation 1 to 8, the specific file stored on the smartphone 400 is transferred to the MFP 300 wirelessly connected to the smartphone 400. Thus, as shown in FIG. 8, the user can check the transferred file on the display 302 of the MFP 300.

Comparing the second preferred embodiment with the comparative example, while the procedure of user operations in the former one includes seven operations, operations 1 to 7, as described above, in the latter one the procedure of user operations includes eight operations, operations 1 to 8, as described above. Namely, according to the second preferred embodiment, the "wireless network connection information display screen" of the MFP 300 is automatically switched to the next "file transfer password display screen". Therefore, the second preferred embodiment has superiority in that user operations are simple and easy compared to the comparative example where the user needs to manually switch the "wireless network connection information display screen" to the next "file transfer password display screen".

Third Preferred Embodiment

FIG. 1 is an image diagram showing a wireless connection between an image processing apparatus according to the first, second and third preferred embodiments of the present invention and an external communication apparatus. FIGS. 4 and 5 are a block diagram showing a schematic configuration of an image processing apparatus of the third preferred embodiment of the present invention and a block diagram showing a schematic configuration of an external communication apparatus which is wirelessly connected to the image processing apparatus, respectively. FIG. 6 is an illustrative diagram describing the progress of operations for a wireless connection between the image processing apparatus of the third preferred embodiment of the invention and the external communication apparatus.

The schematic configuration of the image processing apparatus of the third preferred embodiment shown in FIGS. 1 and 4 to 6 and the schematic configuration of the external communication apparatus wirelessly connected to the image processing apparatus are basically the same as those in the second preferred embodiment. In addition, the procedure of operations for a wireless connection between the image processing apparatus of the third preferred embodiment and the external communication apparatus is basically the same as operations 1 to 7 which is the procedure of operations of the second preferred embodiment.

The differences between the image processing apparatus of the third preferred embodiment and the image processing apparatus of the second preferred embodiment are as follows.

Predetermined patterns of sounds which are generated by a sound generator 403 of a smartphone 400 wirelessly connected to an MFP 300 defining and serving as an image processing apparatus of the third preferred embodiment are set in advance according to specific information to be displayed on a screen of a display 402. Here, each pattern is preferably generated by variously combining two types of sounds, strong and weak sounds, and sounds of two different types of tones. A plurality of patterns according to a plurality of pieces of specific information to be displayed on the screen of the display 402 are used.

In addition, a sound which is sent from a sound transmitter 404 and externally outputted from a speaker 406 is a specific sound based on the above-described plurality of patterns. Unlike the second preferred embodiment, the sound is audible to the human ear.

According to the third preferred embodiment configured in the above-described manner, a "wireless network connection information display screen" of the MFP 300 is automatically switched to the next "file transfer password display screen". Therefore, user operations are simple and easy compared to conventional cases.

A preferred embodiment of the present invention also includes a combination of any of the above-described preferred embodiments of the present invention.

In addition to the above-described preferred embodiments, there may be various modifications and variations of the present invention within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An image processing apparatus configured to be wirelessly connected to an external communication apparatus, the image processing apparatus comprising:
   a communicator configured to perform wireless communication with the external communication apparatus;

a display configured to display various types of information on a screen;

a sound receiver configured to receive a sound generated by a speaker of the external communication apparatus; and a screen switch configured to switch the screen of the display based on the sound received by the sound receiver; wherein when the sound receiver receives the sound generated by the speaker of the external communication apparatus, the screen switch is configured to switch the screen of the display according to screen information displayed on the external communication apparatus;

the image processing apparatus further comprises an authenticator configured to perform connection authentication with the external communication apparatus, and the authenticator is configured to perform connection authentication with the external communication apparatus based on the sound received by the sound receiver, the sound is a sound as a signal for indicating that connection authentication operation with the image processing apparatus is progressing, and then, the screen switch switches the screen of the display to a screen necessary for operations to be performed after the connection authentication.

2. The image processing apparatus according to claim 1, wherein the sound sent by the external communication apparatus has a sound pattern set according to information to be displayed on the external communication apparatus.

3. The image processing apparatus according to claim 2, wherein the sound pattern is set based on at least one of loudness, pitch, length, and tone of sound.

4. The image processing apparatus according to claim 1, wherein the sound sent from the external communication apparatus uses a frequency band inaudible to humans and receivable by the sound receiver.

5. The image processing apparatus according to claim 4, wherein a frequency band of the sound is from 20 to 25 kilohertz.

6. The image processing apparatus according to claim 1, wherein the operations include an input of a password to transfer a file stored on the external communication apparatus to the image processing apparatus, authentication of the password subsequent to the input, and transmission of the file subsequent to the authentication.

* * * * *